US012692201B2

(12) United States Patent
Lenz et al.

(10) Patent No.:  US 12,692,201 B2
(45) Date of Patent:       Jul. 28, 2026

(54) FILAMENT DISPERSION PROCESS

(71) Applicant: RTX Corporation, Farmington, CT (US)

(72) Inventors: Brendan Lenz, North Branford, CT (US); John D. Riehl, Hebron, CT (US); Nil Parikh, Newington, CT (US); Olivier H. Sudre, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 49 days.

(21) Appl. No.: 18/672,746

(22) Filed: May 23, 2024

(65) Prior Publication Data

US 2025/0361188 A1      Nov. 27, 2025

(51) Int. Cl.
*C04B 35/80*          (2006.01)

(52) U.S. Cl.
CPC ........ *C04B 35/80* (2013.01); *C04B 2235/606* (2013.01); *C04B 2235/608* (2013.01); *C04B 2235/616* (2013.01); *C04B 2235/65* (2013.01)

(58) Field of Classification Search
CPC .............. C04B 35/80; C04B 2235/606; C04B 2235/608; C04B 2235/616; C04B 2235/65; C04B 2235/5224; C04B 2235/5228; C04B 2235/5236; C04B 2235/524; C04B 2235/5248; C04B 35/571; C04B 35/573; C04B 35/62868; C04B 35/62897; C04B 2235/5244; C04B 2235/5252; C04B 2235/614; C04B 35/63416; C04B 35/6342; C04B 35/56
See application file for complete search history.

(56) References Cited

U.S. PATENT DOCUMENTS

| | | | |
|---|---|---|---|
| 5,660,877 | A | 8/1997 | Venkataramani et al. |
| 8,584,356 | B2 | 11/2013 | Philippe et al. |
| 10,427,984 | B2 | 10/2019 | Sheedy et al. |
| 11,753,947 | B2 | 9/2023 | Carlin et al. |

(Continued)

FOREIGN PATENT DOCUMENTS

| | | |
|---|---|---|
| EP | 2995597 B1 | 11/2017 |
| EP | 3640022 A1 | 4/2020 |

(Continued)

OTHER PUBLICATIONS

European Search Report dated Oct. 10, 2025 issued in corresponding application 25178612.5.

(Continued)

*Primary Examiner* — Michael M. Robinson
(74) *Attorney, Agent, or Firm* — Millen, White, Zelano & Branigan P.C.; Ryan R. Pool

(57)          ABSTRACT

A method of spreading fibers of a tow including heat treating a fibrous preform having a plurality of tows and a resin mixture including an alcohol soluble binder, washing the fibrous preform with a solution of water and a water-soluble binder such that the solution occupies an intra-tow space of the plurality of tows, freezing the solution in the intra-tow space of the plurality of tows, and freeze-drying the fibrous preform. The method also includes making a CMC from the fibrous preform with spread tows.

18 Claims, 5 Drawing Sheets

(56)         References Cited

U.S. PATENT DOCUMENTS

| 2013/0287941 | A1* | 10/2013 | Gray | C04B 35/573 |
| | | | | 427/228 |
| 2018/0155252 | A1* | 6/2018 | Sheedy | C04B 35/62281 |
| 2021/0403384 | A1* | 12/2021 | Ederyd | B21C 3/02 |
| 2023/0150244 | A1* | 5/2023 | Ito | B29C 45/14311 |
| | | | | 428/457 |
| 2023/0192560 | A1* | 6/2023 | Enos | D02J 1/18 |
| | | | | 427/294 |

FOREIGN PATENT DOCUMENTS

| EP | 4197988 | A1 | 6/2023 |
| WO | 2012083921 | A1 | 6/2012 |

OTHER PUBLICATIONS

Schlordt T et al: "Novel oxide fibre composites (OFC) with porous matrices", CFI/BER. DKG: Ceramic Forum International: CFI ; Berichte Der Deutschen Keramischen Gesellschaft, Goeller Verlag GMBH, DE, vol. 95, Jan. 1, 2018, pp. E149-E152.

* cited by examiner

Figure 3:
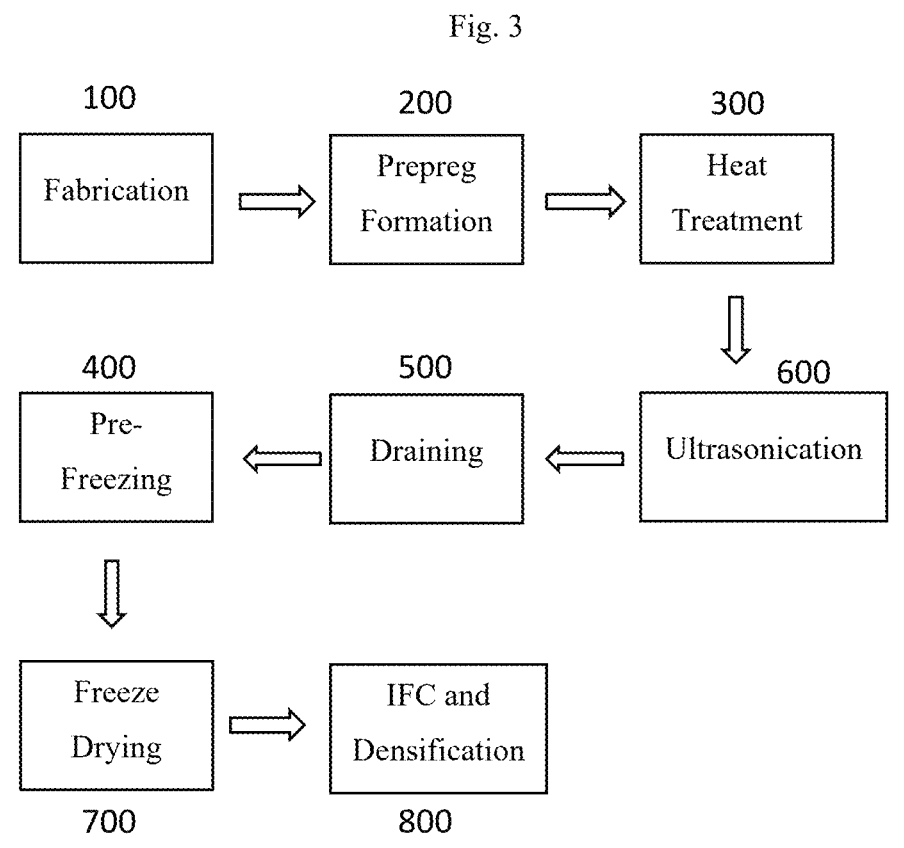

100
Fabrication

200
Prepreg Formation

300
Heat Treatment

400
Pre-Freezing

500
Draining

600
Ultrasonication

Freeze Drying
700

IFC and Densification
800

Fig. 5

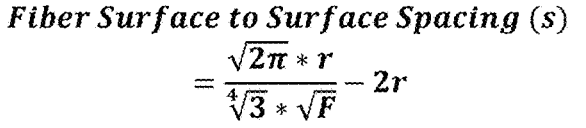

$$\text{Fiber Surface to Surface Spacing } (s) = \frac{\sqrt{2\pi} * r}{\sqrt[4]{3} * \sqrt{F}} - 2r$$

$$\text{Tow Area } (A_{tow}) = \frac{n\pi r^2}{F}$$

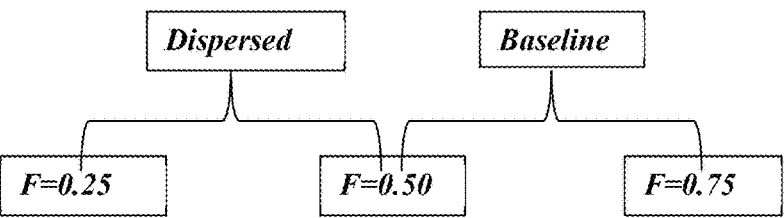

Dispersed          Baseline $F=0.25$          $F=0.50$          $F=0.75$ $$s = \frac{\sqrt{2\pi} * r}{\sqrt[4]{3} * \sqrt{0.25}} - 2r$$   $$s = \frac{\sqrt{2\pi} * r}{\sqrt[4]{3} * \sqrt{0.50}} - 2r$$   $$s = \frac{\sqrt{2\pi} * r}{\sqrt[4]{3} * \sqrt{0.75}} - 2r$$

$$s = 1.81 * r$$   $$s = 0.69 * r$$   $$s = 0.20 * r$$

$$A_{tow} = \frac{n\pi r^2}{0.25}$$   $$A_{tow} = \frac{n\pi r^2}{0.50}$$   $$A_{tow} = \frac{n\pi r^2}{0.75}$$

Example: number of fibers per tow $n=500$ fibers/bundle $r=6.5\ um$

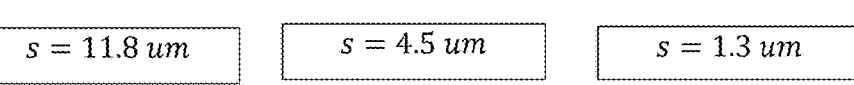

$$s = 11.8\ um$$   $$s = 4.5\ um$$   $$s = 1.3\ um$$

$$A_{tow} = 265,465\ um^2$$   $$A_{tow} = 132,732\ um^2$$   $$A_{tow} = 88,488\ um^2$$

FILAMENT DISPERSION PROCESS

FIELD OF THE INVENTION

The present disclosure relates to composites, and more particularly, to the preparation of preforms including woven ceramic fabrics for use in ceramic matrix composites (CMCs).

The present disclosure specifically relates to increasing filament spacing in ceramic composite preforms to achieve a more uniform deposition of the interface coating and matrix around each filament with the purpose of improving mechanical performance of the composite material and life of the components.

BACKGROUND OF THE INVENTION

In the processing of ceramic matrix composites (CMCs), it is important for in-plane mechanical properties and durability to apply a uniform interface coating around the surfaces of all the fibers within the preform for in-plane and out-of-plane mechanical properties and durability. It is beneficial to this goal to uniformly infiltrate the gaseous or liquid precursors within and around the tows. In a woven CMC system where filaments tend to pack tightly, pores or voids through which matrix can infiltrate can be non-uniform in size which causes the final microstructure to be non-uniform and can potentially result in the presence of defects in the resulting CMC components. For the purposes of this application, filaments and fibers will be understood to refer to the same kind of structure. It will be also be understood that filaments and fibers may refer to tows of filaments or fibers.

It is often difficult to uniformly coat the fibers due to fibers being very close to or touching each other because of, for example, tension created in the process of weaving the fibers, cohesive forces during drying steps of a binder solution, contact pressure in the preform, etc. It is desirable to increase the spacing between the fibers prior to the coating process of the filaments and the infiltration of the matrix between the filaments to achieve a more uniform microstructure. This can improve thermomechanical properties and durability of the resulting CMC components.

SUMMARY OF THE INVENTION

A benefit achieved herein is to increase the filament-to-filament spacing in a fiber preform, which will translate to a more uniform interface and matrix coating on the fibers in the final product. This may be achieved by controlling the filament to filament spacing by re-structuring and can also include expanding the volume occupied by the fiber tows relative to the final product as a whole.

The method generally includes fabricating a preform by impregnating fiber plies with a first binder solution and compressing the plies to form a preform. The preform is then heat-treated to remove the binder while the preform is held in a tool. The fibrous preform is then re-infiltrated with a second binder, which may be water-based, such that the solution wets the fiber and infiltrates the intra-tow space of the plurality of tows. A step of freezing the solution in the intra-tow space of the plurality of tows is then performed followed by freeze-drying the fibrous preform.

Such a method provides a more uniform interface coating and matrix leads to a more reliable thermomechanical behavior of the composite, particularly at high temperature. The process is also scalable to any preform/tool geometry and can be implemented after weaving and preforming. This process does not add significant cost or cycle time to a production process, while enhancing the preform microstructure and accompanying properties.

The present disclosure is directed, in a first aspect, to a method of spreading fiber tows. The method includes heat treating a fibrous preform which includes a plurality of tows and a resin mixture comprising an alcohol soluble binder. Next, a washing step occurs where the fibrous preform is washed with a solution of water and a water-soluble binder such that the solution occupies an intra-tow space of the plurality of tows. Thereafter, a freezing step is performed wherein the solution within the intra-tow space of the plurality of tows is frozen, followed by freeze-drying of the fibrous preform.

The method may also include molding the fibrous preform into a predetermined shape prior to heat treatment.

In some embodiments, the alcohol soluble binder is polyvinyl butyral (PVB). The water-soluble binder may be, for example, polyvinyl alcohol (PVA).

Freeze-drying the fibrous preform in the method above, may provide a porous three-dimensional scaffold in the intra-tow space of the plurality of tows, wherein the three-dimensional scaffold includes the water-soluble binder.

In some embodiments, washing the fibrous preform comprises removing char formed on the plurality of tows and within the intra-tow space of the plurality of tows resulting from heat treating. This can be achieved, for example, by an ultrasonication process which may be part of the washing step.

The method may also include draining the fibrous preform after washing to remove part of the solution of water and a water-soluble binder, where the draining does not remove the solution from the intra-tow space of the plurality of tows.

In some embodiments, the method may also include heating the freeze dried fibrous preform to a temperature between 300° C. and 500° C. to remove the water-soluble binder, for example, after the preform is transferred to a CVI reactor.

In yet another embodiment, the present disclosure is directed to a method of manufacturing a ceramic matrix composite. The method includes heat treating a fibrous preform which includes a plurality of tows and a resin mixture comprising an alcohol soluble binder. Next, a washing step occurs where the fibrous preform is washed with a solution of water and a water-soluble binder such that the solution occupies an intra-tow space of the plurality of tows. Thereafter, a freezing step is performed wherein the solution within the intra-tow space of the plurality of tows is frozen, followed by freeze-drying of the fibrous preform. After heating the fiber preform, a step of densifying the fiber preform is performed.

The method may also include draining the fibrous preform after washing to remove part of the solution of water and a water-soluble binder, wherein the draining does not remove the solution from the intra-tow space of the plurality of tows.

In other embodiments of the present disclosure, a fibrous preform is provided. The fibrous preform includes a plurality of tows, where the fiber packing factor is from 0.25 to 0.50.

The plurality of tows may have an average fiber surface-to-surface distance of 1-5 μm and the tows may have an area of from 135,000-270,000 $\mu m^2$.

BRIEF DESCRIPTION OF FIGURES

Implementations of the inventive concepts disclosed herein may be better understood when consideration is given to the following detailed description thereof. These drawings are not necessarily to scale, and which some features may be exaggerated and some features may be omitted or may be represented schematically in the interest of clarity. Like reference numerals in the drawings may represent and refer to the same or similar element, feature, or function.

The features of the disclosure believed to be novel and the elements characteristic of the invention are set forth with particularity in the appended claims. The figures are for illustration purposes only. The disclosure itself, however, both as to organization and method of operation, can best be understood by reference to the description of embodiment(s) which follows, taken in conjunction with the accompanying drawings in which:

FIG. 2 shows a pair of tows resulting from a comparative process not of the current disclosure and from a process of the current disclosure.

FIG. 3 is a flow diagram of a process for making ceramic matrix composites.

FIG. 5 is a comparative example between dispersed and baseline tows showing various differences in the physical properties of these tows.

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Broadly, embodiments of the concepts disclosed herein are directed to improving filament-to-filament spacing in ceramic fiber CMCs prior to interface coating by the use of a freeze-drying process.

Fibers which may be included in the embodiments of the present disclosure include, for example, silicon carbide (SiC), carbon (C), silicon oxycarbide (SiOC), silicon nitride ($Si_3N_4$), silicon carbonitride (SiCN), hafnium carbide (HfC), tantalum carbide (TaC), silicon borocarbide (SiBC), silicon borocarbonitride (SiBCN), Zirconium carbide (ZrC), silicon aluminum carbon nitride (SiAlCN), silica, alumina, mullite, garnet, aluminosilicate, arimad fiber, spectra, and basalt.

Some acceptable fibers are commonly used in ceramic matrix composites under trade names such as NICALON® SiC fibers, and TYRANNO® for the smaller diameter fibers or SCS SiC fibers for the larger diameter fibers. Acceptable fibers of the fibrous textile (10) may include Si—C—O fibers, Si—Ti—C—O fibers, Si—Zr—C—O fibers, SiBN3C fibers, and silicon nitride ($Si_3N_4$) fibers. Ceramic oxide fibers may also be used. Ceramic oxide fibers include oxide compounds, such as alumina ($Al_2O_3$), mullite ($3Al_2O_3$-$2SiO_2$) such as 3M Nextel 610® or Nextel 720®, and zirconia ($ZrO_2$). Oxide fibers are generally polycrystalline.

The pore size of the intra-tow region has a significant effect on densification uniformity of fibrous composites resulting from, for example, a chemical vapor infiltration (CVI) process. In particular, relatively small pore sizes in the intra-tow region significantly reduces the uniformity of densification of fibrous composites. Improving intra-tow distribution uniformity while ensuring sufficient intra-tow spacing allows for an increase in the uniformity of the interface coating and matrix distribution throughout the intra-tow region which reduces fiber to fiber contact in the final CMC. This provides a number of advantageous properties in the resulting CMC.

Figure 1:
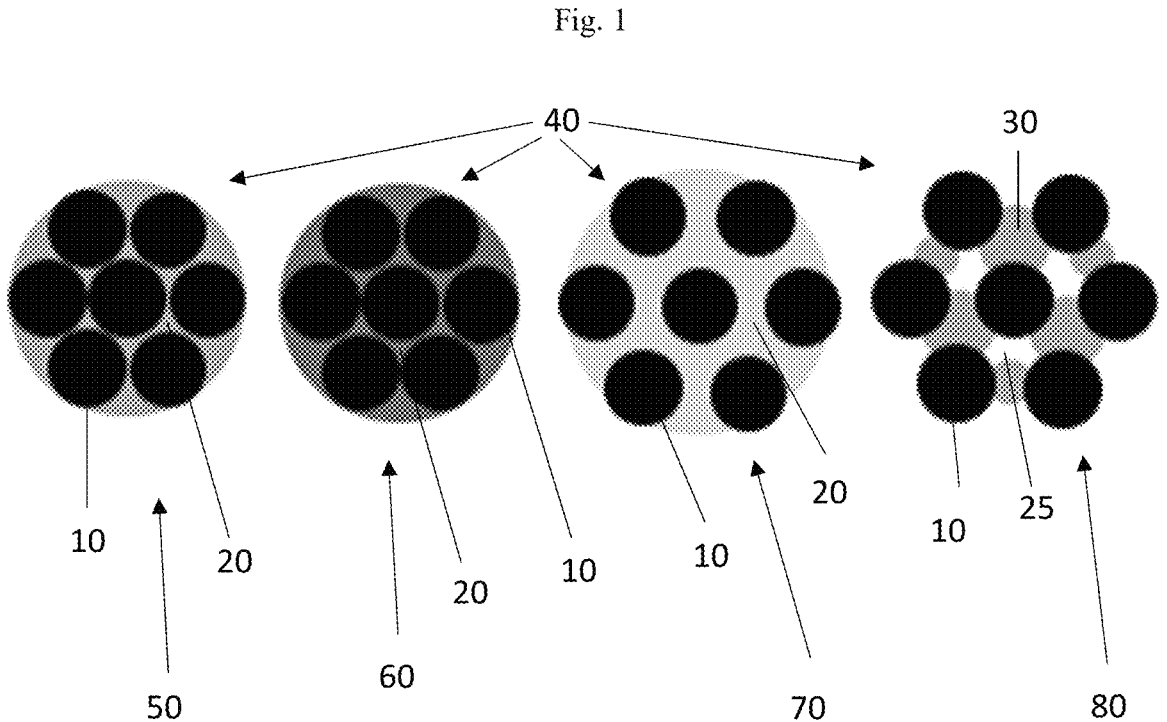
FIG. 1 is a schematic comparing the structure of tows exposed to the various processes described herein.

FIG. 1 shows structural differences in tows (40) exposed to various processes. The first tow (50) depicted is a typically sized tow which has not been subject to the process described herein.

The second tow (60) depicted is a tow that has been wetted with, for example, a solution of water and a water-soluble binder. In tow (60), the solution has penetrated into the intra-tow space (20) and surrounds the fibers (10). The fibers (10) may undergo a small amount of spreading in this state.

The third tow (70) depicted is tow (60) after having been frozen. As shown, the formation of ice crystals in the intra-tow space (20) cause the expansion of the fibers (10). The intra-tow space (20) is increased in a uniform manner and the overall size (i.e., cross-sectional area) of the tow (70) is increased as a result of the expanded intra-tow space (20). The tow spreading which occurs after the formation of the ice crystals in the intra-tow space is significant and much greater than any tow spreading which occurs from wetting as shown in tow (60).

Figure 2:
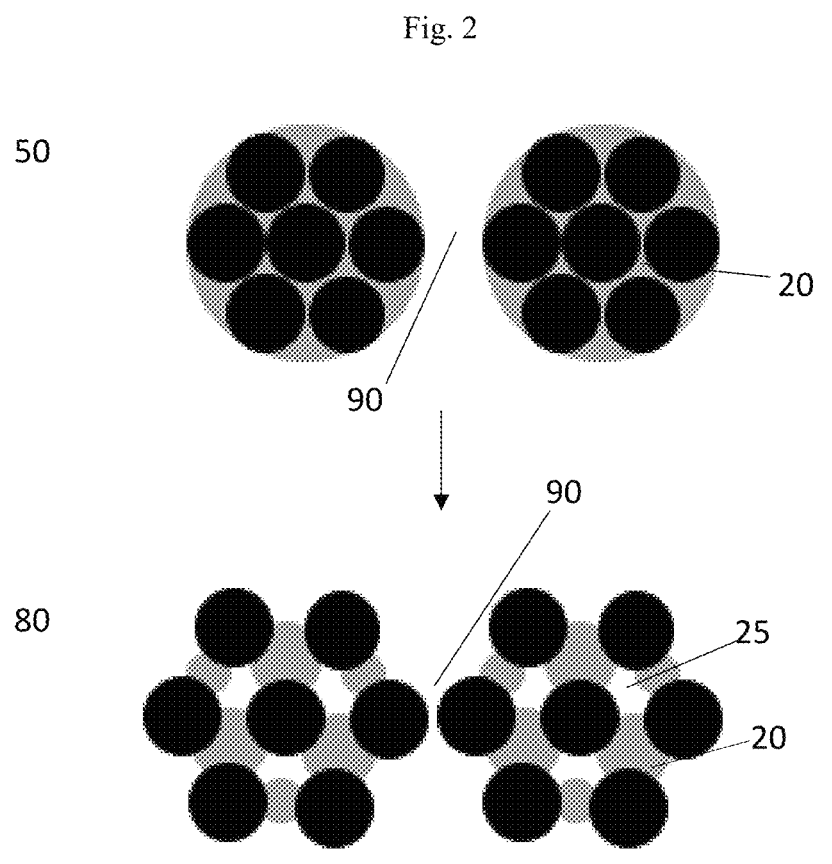

One will understand that a comparison of tows (60) and (70) from FIGS. 2 and 3 demonstrates that the spreading which has occurred in tow (70) is significantly more than any which has occurred in tow (60), but the ratio or specific amount of spreading depicted in the figures is merely illustrative.

The fourth tow (80) depicted is tow (70) after having undergone a freeze-drying process. The water has been nearly completely or completely sublimated out of the tow (80) and a scaffold which may be a freeze-dried foam (30) has formed from the binder left behind by the freeze-drying process. As shown, in tow (80) the expanded intra-tow space (20) is maintained even in the absence of the ice crystals shown in tow (70). The scaffold (30) may only occupy a portion of the intra-tow space (20) and may provide for voids (25) in the intra-tow space (20). This freeze-drying and scaffold formation advantageously promotes homogeneity of the preform following tow spreading and thereby improves densification uniformity in the final CMC which may be formed.

The fiber packing factor within the tow bundles of expanded tows (70) and (80) decreases from around 50-75% in typical tows (50) and (60) to around 25-50%.

FIG. 2 illustrates a pair of tows (50) resulting from a process that does not include freezing or freeze drying. That is, tows (50) are typically sized tows which have not been subject to the process described herein. As shown, the intra-porosity (25), i.e., the porosity formed by pores between fibers of an individual tow, is relatively small and the inter-pore space (90), i.e., the porosity formed by pores between tows, is relatively large.

FIG. 2 also illustrates a pair of tows (80) that have been processed via the freeze-drying process described herein. As a result of the freeze-drying process, in comparison to the tows (50), tows (80) have an intra-porosity (25) which is comparatively larger and an inter-pore space (90) that is comparatively smaller.

FIG. 2 also illustrates that the tow spreading does not substantially change the overall ends-per-inch (EPI) and/or picks-per-inch (PPI) of the fibrous composite resulting from the freeze-drying process described herein. Rather, the expanded intra-tow area (20) resulting from tow spreading is offset by the reduction of the inter-tow space (90), i.e., the relative spacing between tows (80) in the fibrous preform. That is, as a result of the process described herein the intra-tow volume can be increased without the overall size of the resulting composite material being changed. In other embodiments, however, tow spreading can be used to increase the PPI and/or EPI of fibrous composite.

FIG. 3 is a flow diagram of a process for making ceramic matrix composites. In a first step (100) and preform is fabricated with tows of fibers, for example, silicon carbide (SiC) fibers. The tows may be unidirectional, a debulked 2D weave layup, biaxial/triaxial braid layup, or 3D weave. The SiC fibers tows may be woven together to form a fabric. Other fibers may also be acceptable, for example, carbon fibers or oxide fibers, for example, alumina ($Al_2O_3$), mullite ($3Al_2O_3$-$2SiO_2$), and/or zirconia ($ZrO_2$).

The preform includes a binder, for example, an alcohol soluble binder, for example, a polyvinyl butyral (PVB). The binder may be present in a resin mixture, for example, a PVB resin mixture including PVB and a solvent. The solvent may be an alcohol solvent, for example, ethanol. The solvent may also be, for example, acetic acid, acetone, methanol, ethanol, 2-propanol, butanol, 2-butoxyethanol, cyclo-hexanone, benzyl alcohol, 1-methoxy-propanol-2, butyl gly-col, n-butyl acetate, ethyl acetate, N,N-dimethylacetamide (DMA), N,N-dimethylformamide (DMF), N,N-dimethyl-sulfoxide (DMSO), N-methylpyrrolidone (NMP), or tetra-hydrofurane (THF).

The resin mixture may have, for example, 15 wt % to 60 wt % PVB, for example, 30 wt % to 40 wt % PVB. Other additives may also be included in the PVB resin mixture. For example, inorganic particles including SiC, copper fibers, boron carbide ($B_4C$), Hafnium Diboride ($HfB_2$), Ytterbium Oxide ($Yb_2O_3$), and Alumina ($Al_2O_3$). Organic or inorganic fillers may also be introduced for mechanical or thermal performance optimization. The prepreg may also include backing films on the exterior of the prepreg to aid in the handling of the material. The prepreg composite material is wet and solvated with properties similar to that of a wet fabric material with high flexibility.

The addition of the resin mixture can result in some minor amount of tow spreading as, for example, the resin mixture moves into the intra-tow space between the fibers (10) as seen in FIG. 1.

In a second step (200), the prepreg is formed into a desired shape in a mold, for example, a metal mold. A first heat treatment is applied which evaporates the solvent (e.g., ethanol) from the prepreg. The temperature of the first heat treatment is sufficient to evaporate the ethanol without decomposing the PVB, for example, 75° C. to 260° C., 125° C. to 170° C., or 150° C. The backing films are removed as the prepreg is placed in the mold and before the first heat treatment. After the removal of the solvent, a dry preform with a rigid physical structure is formed, for example, a rigid dry SiC/PVB preform which has been shaped by the mold. The resulting dry prepreg composite material has, for example, less than 1% of the solvent remaining.

The physically properties of the preform is non-tacky and rigid resulting in it being ideally physically suitable for handling and having handling characteristics that are highly compatible with automated handling methods, for example, handling by robots. This handling can include, for example, physically moving the preform around, cutting, shaping, or stamping the preform.

Such preforms also provide advantages in small geometry applications, such as applications involving flat patterns with fine features. For example, making fine cuts, etching, or cutting with a laser, and stamping the material is made much easier by the preforms of the process described herein. The preforms address handling issues associated with such manipulations of preforms, and allow for fine detail pro-cessing of the material without substantial risk of compro-mising the material for its downstream uses.

In a third step (300), the preform is placed in a graphite tool which holds the preform in position during processing. The graphite tool can be a perforated structure suitable for use in CVI or suitable for use in a chemical vapor deposition (CVD) process, a polymer infiltration and pyrolysis process (PIP), or a melt infiltration process (MI). A second heat treatment is applied to burn off the binder. This heat treat-ment is done at a higher temperature than the first heat treatment, for example, temperatures over 260 C°, for example, temperatures over 1000 C°.

In a fourth step (400) the preform is subjected to an ultrasonication process. The ultrasonication process removes char from the tows which results from the burning off of the binder by the second heat treatment in the third step discussed above. This may result in minor movement of the fibers within the tow but primarily functions to clean all the surfaces of fibers of any remaining char which later facilitates uniform coating of fibers with, for example, an interface coating.

The ultrasonication process is performed in an ultrasonic bath including a solution of water and a water-soluble binder, for example, polyvinyl alcohol (PVA) which re-introduce a wet binder into the preform. The solution includes, for example, about 5-20% of binder (e.g., PVA). The binder, e.g., PVA, in the aqueous solution forms a porous three-dimensional scaffold (30) both between and within tows of the preform.

In a fifth step (500) the binder solution is drained and wiped from the surface of the preform. However, even after draining and wiping, a portion of the solution remains in the intra-tow space (20) of the preform. Generally, about 40% to 60% of the pore volume of the intra-tow space (20) that is filled with solution remains in the preform after draining and wiping, for example, 45%, 50%, or 55%, and 40% to 60% of the solution is drained out.

In a sixth step (600) the preform is pre-frozen to solidify and expand the water in the preform in the intra-tow space. As the aqueous solution in the intra-tow space (20) freezes, it expands and forms ice crystals. This results in the fibers of the tows being spread by forcing fibers (10) apart and increasing the pore size of the intra-tow space (20). Not only is the intra-tow space (20) increased, but the uniformity of the tow (40) overall is increased and the intra-tow space (20) takes on a more uniform overall structure. This advanta-geously promotes the homogeneity of a final fibrous com-posite resulting from the process described herein by improving densification uniformity during, for example, a matrix infiltration, such as a CVI process, as described below in the eighth step (800) below.

In a seventh step (700) the pre-frozen preform is placed in a vacuum chamber and subjected to low temperature and pressure so as to freeze dry the preform. The temperature is generally kept below 40° C. and the pressure is generally kept at or below 30 millibar. The goal of the process it to sublimate the ice out of the preform without allowing any liquification which could reverse the tow spreading achieve by the freezing process. The specific temperature and pres-sure during the freezing process can be adjusted to achieve the goal of sublimation without liquification. The freeze-drying process removes the water, but retains the PVA which forms a scaffolding (30) in the intra-tow space (20) to hold the fibers (10) in place and apart from each other.

Freeze-drying to remove water offers a number of advantages over evaporative drying. For example, freeze-drying preserves the porous three-dimensional network created by the binder—see fourth step (400). The porous three-dimensional network forms a scaffolding (30) in the intra-tow space (20) to hold filaments apart during sublimation and advantageously preserves the separation between fibers (10). Conversely, evaporative drying of fibers forms liquid water, which can dissolve the scaffolding (30) and reduce or destroy the uniform spaced intra-tow space (20), as without the scaffolding (30) the fibers (10) can collapse back together into a packed formation with fibers in physical contact with their neighbors resulting in small intra-tow pore sizes.

Further, capillary forces can increase aggregation of the fibers (10) of tows (40) during evaporate drying and in some cases cause fibers (10) to pack more tightly than was the case prior to freezing. For the foregoing reasons, the freeze-drying process described above, offers a number of advantages over evaporative drying. The freeze-drying step above can be performed using any suitable apparatus which can provide the necessary temperature and pressure conditions.

Following the freeze-drying process step, the binder and, in some embodiments, optional additives, remain in the fibrous composite.

In an eighth step (800), the preform is transferred to, for example, a CVI reactor to subject the preform to an interface coating (IFC) and densification process. As a result of the process described herein the interface coating uniformity will advantageously be more consistent as a result of the increased filament spacing.

In some embodiments, pyrolysis of the freeze-dried PVA foam/scaffolding structure (30) may occur prior to the interface coating and densification process. During this pyrolysis step, the preform is heated to burn off the binder (30) and leave only fibers. This pyrolysis can result in clean vaporization of the carbon portion of the binder to remove it completely from the system. For example, the binder can be burnt off between 300° C. and 500° C. prior to interface coating. The intra-tow space (20) is then filled by the matrix applied via, for example, CVI.

Alternatively, graphitization of the freeze-dried PVA foam may occur to form a rigid structural scaffold prior to IFC. Graphitization converts carbon into graphite and can occur at a temperature range of about 1900-2800° C.

In addition to the above, a boron nitride coating may be applied on the spaced fibers. The coating may have a thickness of from, for example, 30 nm to 1 micron or from 30 nm to 70 nm or from 50 nm to 70 nm, for example, a thin layer of in-situ grown crystalline BN may be provided on the surface of the spaced fibers. Such boron nitride coatings are beneficial for improved performance parameters of the final composite product.

The structure of the tows (40) enable the interface coating to be uniformally and consistently applied to all surfaces of the fibers (10) of the tow (40) with the increased intra fiber space (20) and less difference between the intra-(20) and inter-(50) matrix density in the final CMC material. The fiber-to-fiber contact (10) is also reduced by the combination of effects above. This results in at least the reduction, if not elimination, of fibers bunching together within the tow which can lead to group failure when exposed to stress.

Densification of the preform yields the CMC. The preform can undergo matrix formation and densification via, for example, a chemical vapor infiltration (CVI) process, a chemical vapor deposition (CVD) process, a polymer infiltration and pyrolysis process (PIP), a melt infiltration process (MI), or a combination of two or more of CVI, CVI, PIP, and MI, until the resulting CMC has reached the desired residual porosity. The resulting matrix material can be, for example, a silicon carbide or other suitable ceramic material.

The dispersed tows that have been subject to the method described herein are physically different from tows which are not subject to the method described herein. The physical differences can be expressed in a number of physical properties which are defined below.

One such physical property is the fiber packing factor (F). The fiber packing factor F is determined by the following equation:

$$F = \frac{\frac{\pi r^2}{2}}{\frac{\sqrt{3}}{4} * a^2}$$

wherein (a) is defined as the distance between the longitudinal axes of adjacent fibers tows and (r) is the radius of a fiber.

Using the above equations for the fiber packing factor F, inserting a=s+2r, and solving for (s), yields the following equation where fiber surface-to-surface spacing (s) is defined as:

$$s = \frac{\sqrt{2\pi} * r}{\sqrt[4]{3} * \sqrt{F}} - 2r$$

The fiber packing factor can also be defined as:

$$F = \frac{A_{fibers\ in\ tow}}{A_{tow}}$$

This equation can also be written as:

$$F = \frac{n\pi r^2}{A_{tow}}$$

wherein (n) is defined as the number of fibers in each tow bundle.

Therefore, by rearranging the above equation, tow area can be defined as:

$$A_{tow} = \frac{n\pi r^2}{F}$$

Figure 4:
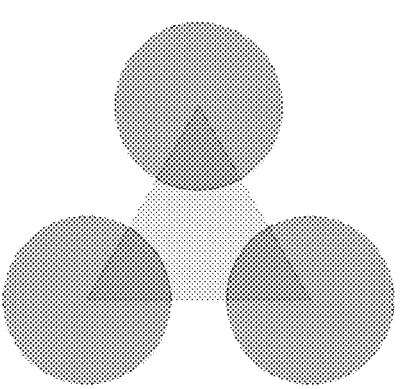
FIG. 4 shows the method for calculating fiber spacing using the area of the triangle formed from the longitudinal axes of adjacent fibers.
Figure 4:
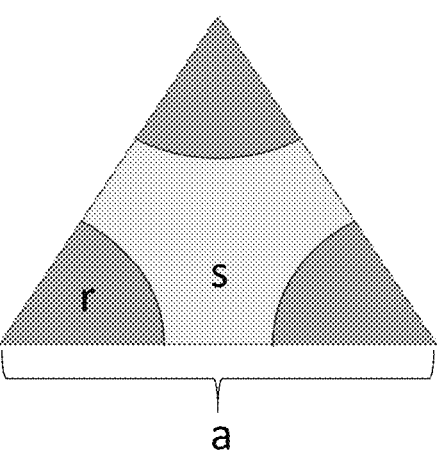

The fiber packing factor F, i.e., the fraction of the tow cross sectional area occupied by the fibers can also be defined as:

$$\frac{A_{fiber\ in\ unit\ cell}}{A_{triangle}}$$

where the "$A_{triangle}$" refers to the area of the triangle formed from the longitudinal axes of adjacent fibers as shown in FIG. 4.

FIG. 4 shows a method for calculating fiber spacing using the area of the triangle formed from the longitudinal axes of adjacent fibers where "s" (fiber surface-to-surface spacing)=a−2r. In FIG. 4 a theoretical triangle can be formed from the center of three tows and the space between these fibers is determined. Solely for illustrative purposes, an equilateral triangle is depicted in FIG. 4.

A comparative example showing the physical differences between a dispersed and baseline tow is provided in FIG. 5. FIG. 5 uses the above equations to illustrate the physical differences between the dispersed and baseline tows. In FIG. 5, for the purposes of calculation, the number of fibers per tow used is 500 and the radius of a fiber is 6.5 μm.

The "baseline" referred to in FIG. 5 can be understood as a tow similar to that of tow (50) depicted in FIG. 1. The "dispersed" referred to in FIG. 5 can be understood as a tow similar to that of tow (80) as depicted in FIG. 1 which has undergone the process described herein.

For the dispersed embodiments described herein, F has a value of 0.25 to 0.50. Comparatively, the value of F in the baseline comparative embodiments is above 0.50 and generally up to about 0.75.

As shown in FIG. 5, the process herein provides, for example, greater fiber surface to surface spacing, greater tow area, and a reduced fiber packing factor. These advantageous physical properties of the tow show the increase in spacing between the fibers of the tow prior to the coating process of the filaments and the infiltration of the matrix between the filaments to achieve a more uniform microstructure. This results in improved thermomechanical properties and durability of the resulting CMC components.

A general summary of the information provided in FIG. 5 can be found below:

| Pedigree | Fiber Packing Factor In Tow (F) | Average Fiber Surface-to-surface Distance (s) (μm) | Tow Area ($T_A$) (μm$^2$) |
|---|---|---|---|
| Baseline | 0.50 < F ≤ 0.75 | 0 ≤ s < 5 | 85,000 ≤ $T_A$ < 135,000 |
| Dispersed | 0.25 ≤ F ≤ 0.50 | 5 ≤ s ≤ 12 | 135,000 ≤ $T_A$ ≤ 270,000 |

Again, the baseline referred to above can be understood as a tow similar to that of tow (50) depicted in FIG. 1 and the dispersed can be understood as a tow similar to that of tow (80) as depicted in FIG. 1 which has undergone the process described herein.

The average surface-to-surface distance of the fibers dispersed in the tows are 8 μm to 16 μm, for example, 9 μm, 10 μm, 11 μm, 12 μm, 13 μm, 14 μm, and 15 μm. The tows are also dispersed in a generally uniform manner. For example, the coefficient of variation (standard deviation/ mean) is less be less than 0.5.

In general, embodiments of concepts disclosed herein are directed to processing and producing a preform with an increased amount of, and increased uniformity of the intra-tow space of preforms which may be used in forming CMCs.

As will be appreciated by one skilled in the art, the embodiments described herein may be embodied as a method, product, or part for use in, for example, manufacturing of CMCs. Accordingly, embodiments described herein may take the form of a portion of a CMC production process including preprocessing.

The corresponding structures, material, acts, and equivalents of all means or steps plus function elements in the claims below are intended to include any structure, material, or act for performing the function in combination with other claimed elements that are specifically claimed. The description of the embodiments described herein has been presented for purposes of illustration and description, but is not intended to be exhaustive or limited to the invention in the form disclosed. The embodiments were chosen and described in order to best explain the principles of the invention and the practical application, and to enable others of ordinary skill in the art to understand the invention for embodiments with various modifications as are suited to the particular use contemplated.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method of spreading fiber tows comprising:
subjecting a fibrous preform to heat treatment, the fibrous preform comprising a plurality of tows and a resin mixture comprising 15 wt % to 60 wt % of an alcohol soluble binder and a solvent, wherein said heat treatment is sufficient to remove at least 99% of the solvent,
washing the fibrous preform, after said heat treatment, with a solution of water and a water-soluble binder such that the solution occupies an intra-tow space of the plurality of tows,
freezing the solution in the intra-tow space of the plurality of tows, and
freeze-drying the fibrous preform including the frozen solution in the intra-tow space of the plurality of tows.

2. The method of claim 1, further comprising:
molding the fibrous preform into a predetermined shape prior to the heat treatment.

3. The method of claim 1, wherein the alcohol soluble binder is polyvinyl butyral (PVB).

4. The method of claim 1, wherein the water-soluble binder is polyvinyl alcohol (PVA).

5. The method of claim 1, wherein freeze-drying the fibrous preform provides a porous three-dimensional scaffold in the intra-tow space of the plurality of tows, wherein the three-dimensional scaffold comprises the water-soluble binder.

6. The method of claim 1, wherein washing the fibrous preform comprises removing char formed on the plurality of tows and within the intra-tow space of the plurality of tows resulting from the heat treatment.

7. The method of claim 1, further comprising: draining the fibrous preform after washing, wherein the draining does not remove all of the solution from the intra-tow space of the plurality of tows.

8. The method of claim 1, wherein the washing comprises an ultrasonication process.

9. The method of claim 1, further comprising:
heating the freeze dried fibrous preform to a temperature between 300° C. and 500° C. to remove the water-soluble binder.

10. A method of manufacturing a ceramic matrix composite comprising:
subjecting a fibrous preform to a heat treatment, the fibrous preform comprising a plurality of tows and a resin mixture comprising 15 wt % to 60 wt % of an alcohol soluble binder and a solvent, wherein said heat treatment is sufficient to remove at least 99% of the solvent, washing the fibrous preform, after said heat treatment, with a solution of water and a water-soluble binder such that the solution occupies an intra-tow space of the plurality of tows, freezing the solution in the intra-tow space of the plurality of tows, freeze-drying the fibrous preform including the frozen solution in the intra-tow space of the plurality of tows, heating the freeze dried fibrous preform to remove the water-soluble binder, and densifying the fiber preform after heating the fiber preform.

11. The method of claim 10, further comprising molding the fibrous preform into a predetermined shape prior to the heat treatment.

12. The method of claim 10, wherein the alcohol soluble binder is polyvinyl butyral (PVB).

13. The method of claim 10, wherein the water-soluble binder is polyvinyl alcohol (PVA).

14. The method of claim 10, wherein freeze-drying the fibrous preform provides a porous three-dimensional scaffold in the intra-tow space of the plurality of tows, and wherein the three-dimensional scaffold comprises the water-soluble binder.

15. The method of claim 10, wherein washing the fibrous preform comprises removing char formed on the plurality of tows and within the intra-tow space of the plurality of tows resulting from the heat treatment.

16. The method of claim 10, further comprising draining the fibrous preform with the solution after washing, wherein the draining does not remove the solution from the intra-tow space of the plurality of tows.

17. The method of claim 10, wherein the washing comprises an ultrasonication process.

18. The method of claim 10, wherein the heat treatment comprises heating the fibrous preform to a temperature of 75° C. to 260° C.

* * * * *